(12) United States Patent
Morita et al.

(10) Patent No.: US 8,563,666 B2
(45) Date of Patent: Oct. 22, 2013

(54) CURABLE SILICONE COMPOSITION AND CURED PRODUCT THEREOF

(75) Inventors: Yoshitsugu Morita, Chiba (JP); Hiroshi Ueki, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 313 days.

(21) Appl. No.: 12/738,463

(22) PCT Filed: Oct. 6, 2008

(86) PCT No.: PCT/JP2008/068516
§ 371 (c)(1),
(2), (4) Date: Apr. 16, 2010

(87) PCT Pub. No.: WO2009/051084
PCT Pub. Date: Apr. 23, 2009

(65) Prior Publication Data
US 2010/0213404 A1    Aug. 26, 2010

(30) Foreign Application Priority Data

Oct. 16, 2007   (JP) ................................ 2007-269034

(51) Int. Cl.
*C08G 77/14*   (2006.01)

(52) U.S. Cl.
USPC ........... 525/476; 524/588; 524/435; 524/439; 524/440

(58) Field of Classification Search
USPC .................. 525/476; 524/588, 435, 439, 440
See application file for complete search history.

(56) References Cited

U.S. PATENT DOCUMENTS

| 5,516,858 A | * | 5/1996 | Morita et al. | ................. | 525/478 |
| 6,225,704 B1 | | 5/2001 | Sumita et al. | | |
| 7,026,382 B2 | * | 4/2006 | Akiba et al. | ................. | 524/268 |

FOREIGN PATENT DOCUMENTS

| JP | 05-295084 A | 11/1993 |
|---|---|---|
| JP | 05-320514 A | 12/1993 |
| JP | 06-306143 A | 11/1994 |
| JP | 07-053870 A | 2/1995 |
| JP | 2000-299414 A | 10/2000 |
| JP | 2005-154766 A | 6/2005 |
| JP | 2006-306953 A | 11/2006 |
| JP | 2007-224146 A | 9/2007 |
| JP | 2008-156475 A | 7/2008 |
| WO | WO 2006-098493 A1 | 9/2006 |
| WO | 2006/118334 * | 11/2006 |
| WO | WO 2006-118334 A1 | 11/2006 |

OTHER PUBLICATIONS

English language translation and abstract for JP 05-295084 extracted from espacenet.com database, dated Jul. 13, 2010, 57 pages.
English language translation and abstract for JP 05-320514 extracted from espacenet.com database, dated Jul. 13, 2010, 44 pages.
English language translation and abstract for JP 07-053870 extracted from espacenet.com database, dated Jul. 13, 2010, 50 pages.
English language translation and abstract for JP 2005-154766 extracted from espacenet.com database, dated Jul. 13, 2010, 55 pages.
English language translation and abstract for JP 2006-306953 extracted from espacenet.com database, dated Jul. 13, 2010, 55 pages.
PCT International Search Report for PCT/JP2008/068516, dated May 13, 2009, 3 pages.
English language abstract and machine-assisted English translation for JP 06-306143 extracted from the PAJ database on Jul. 1, 2013, 32 pages.
English language abstract for JP 2000-299414 extracted from the espacenet.com database on Jul. 2, 2013, 11 pages.
English language abstract and machine-assisted English translation for JP 2007-224146 extracted from the PAJ database on Jul. 1, 2013, 81 pages.
English language abstract and machine-assisted English translation for JP 2008-156475 extracted from the PAJ database on Jul. 2, 2013, 53 pages.

* cited by examiner

*Primary Examiner* — Margaret Moore
(74) *Attorney, Agent, or Firm* — Howard & Howard Attorneys PLLC

(57) ABSTRACT

A curable silicone composition comprising: (A) a liquid organopolysiloxane having in one molecule at least two epoxy groups; (B) a compound containing groups that react with the epoxy groups; (C) a thermally conductive filler; and (D) a silicone powder, preferably, an epoxy-containing silicone powder; possesses excellent handleability and workability in combination with low viscosity and that, when cured, forms a cured body of excellent elasticity, adhesiveness, and thermal conductivity.

13 Claims, No Drawings

CURABLE SILICONE COMPOSITION AND CURED PRODUCT THEREOF

RELATED APPLICATIONS

This application claims priority to and all the advantages of International Patent Application No. PCT/JP2008/068516, filed on Oct. 6, 2008, which claims priority to Japanese Patent Application No. JP2007-269034, filed on Oct. 16, 2007.

TECHNICAL FIELD

The present invention relates to a curable silicone composition and to a cured product obtained by curing the composition.

BACKGROUND ART

Curable epoxy resin compositions that contain thermally conductive fillers and that are used as adhesives and sealants capable of efficiently transmitting heat generated by electronic devices are known in the art. In general, curable epoxy resin compositions produce cured products having a high modulus of elasticity and, therefore, high rigidity. As disclosed in Japanese Unexamined Patent Application Publication (hereinafter referred to as "Kokai") H05-295084 and Kokai H07-53870, it was proposed to solve this problem by means of curable epoxy resin compositions that incorporate epoxy-containing organopolysiloxanes. However, the use of such compositions is limited because they produce cured products which either are still rigid, insufficiently flexible, and are subject to warping or cracking, or delaminate and create gaps between themselves and the surfaces of the electronic devices.

On the other hand, Kokai H05-320514 and Kokai 2005-154766 disclose curable silicone compositions comprising curing agents and epoxy-containing organopolysiloxanes. Cured products obtained from such compositions are soft but still have either a high coefficient of thermal expansion, or low strength and low modulus of elasticity. Kokai 2006-306953 discloses a curable silicone composition that contains a thermally conductive filler. However, in order to obtain a cured product of high thermal conductivity, the composition should contain a large amount of thermally conductive metal powder, in particular a silver powder. In addition, a cured product obtained from such a composition has poor adhesive properties.

It is an object of the present invention to provide a curable silicone composition, which possesses excellent handleability and workability in combination with low viscosity and which, when cured, forms a cured body of excellent elasticity, adhesiveness, and thermal conductivity.

DISCLOSURE OF INVENTION

The curable silicone composition of the invention comprises:
(A) a liquid organopolysiloxane having in one molecule at least two epoxy groups;
(B) a compound containing groups react with the epoxy groups;
(C) a thermally conductive filler; and
(D) a silicone powder.
A cured product of the invention is characterized by being obtained as a result of curing the aforementioned composition.

Effects of Invention

The curable silicone composition of the invention possesses excellent handleability and workability in combination with low viscosity and, when cured, forms a cured body of excellent elasticity, adhesiveness, and thermal conductivity. The cured body of the invention is flexible and has excellent adhesive properties and high thermal conductivity.

DETAILED DESCRIPTION OF THE INVENTION

The organopolysiloxane that constitutes component (A) is the main component of the composition. There are no special restriction with regard to this component provided that this component contains in one molecule at least two epoxy groups. Preferable is the organopolysiloxane represented by the following average unit formula (1):

$$(R^1{}_3SiO_{1/2})_a(R^2{}_2SiO_{2/2})_b(R^3SiO_{3/2})_c(SiO_{4/2})_d$$

In the formula, $R^1$, $R^2$, and $R^3$ are identical or different, and represent halogen-substituted or unsubstituted univalent hydrocarbon groups or epoxy-containing univalent organic groups. The aforementioned univalent hydrocarbon groups can be exemplified by methyl, ethyl, propyl, butyl, pentyl, or similar alkyl groups; vinyl, allyl, butenyl, pentenyl, hexenyl, or similar alkenyl groups; phenyl, tolyl, xylyl, or similar aryl groups; benzyl, phenethyl, or similar aralkyl groups; chloromethyl, 3,3,3-trifluoropropyl, or similar halogenated alkyl groups. The alkyl groups and aryl groups are preferable, especially methyl and phenyl groups. The epoxy-containing univalent organic groups can be exemplified by 2-glycidoxyethyl, 3-glycidoxypropyl, 4-glycidoxybutyl, or similar glycidoxyalkyl groups; 2-(3,4-epoxycyclohexyl)ethyl, 3-(3,4-epoxycyclohexyl)propyl; 2-(3,4-epoxy-3-methylcyclohexyl)-2-methylethyl, or similar epoxycycloalkylalkyl groups; or 4-oxiranylbutyll, 8-oxiranyloctyl, or similar oxiranylalkyl groups. Most preferable are glycidoxyalkyl and epoxycycloalkylalkyl groups, especially 3-glycidoxypropyl and 2-(3, 4-epoxycyclohexyl)ethyl groups. In the aforementioned formula, at least two of the groups designated by $R^1$, $R^2$, and $R^3$ are epoxy-containing univalent organic groups.

Furthermore, in the above formula, 20 mole % or more, preferably 50 mole % or more, and most preferably 80 mole % or more of the groups designated by $R^3$ are aryl groups. If the amount of aryl groups among the groups designated by $R^3$ is less than the recommended lower limit, this will either impair miscibility with component (B) or impair adhesiveness and mechanical strength of a cured product obtained from the composition. Most preferable aryl groups designated by $R^3$ are phenyl groups.

In the above formula, "a", "b", "c", and "d" are numbers that satisfy the following conditions:
$0 \leq a \leq 0.8$; $0 \leq b \leq 0.8$; $0.2 \leq c \leq 0.9$; $0 \leq d < 0.8$; and $[a+b+c+d]=1$. Herein, "a" is a number that indicates the ratio of siloxane units expressed by formula: $R^1{}_3SiO_{1/2}$. However, if component (A) consists only of $R^3SiO_{3/2}$ units, the composition will become too viscous and difficult for handling and processing. Therefore, it is recommended that "a" satisfies the following conditions: $0<a \leq 0.8$, and preferably the following condition: $0.3 \leq a \leq 0.8$. In the above formula, "b" is a number that indicates the ratio of siloxane units expressed by formula: $R^2{}_2SiO_{2/2}$. In order to prevent exudation of this component from the obtained cured product at a predetermined molecular weight and to obtain a product of excellent mechanical strength, it is recommended to maintain the value of "b" in the following limits: $0 \leq b \leq 0.6$. In the above formula, "c" is a number that indicates the ratio of siloxane units expressed by formula: $R^3SiO_{3/2}$. In order to provide good handleability and workability of the composition and to obtain a cured product having good adhesiveness, mechanical strength, and flexibility, the value of "c" should be in the following limits: $0.4 \le c \le 0.9$. In the above formula, "d" is a number that indicates the ratio of siloxane units expressed by formula: $SiO_{4/2}$. In order to provide good handleability and workability of the composition and to obtain a cured product having good adhesiveness, mechanical strength, and flexibility, the value of "d" should be in the following limits: $0 \le d < 0.2$.

There are no special restrictions with regard to component (A), provided that it is liquid at room temperature. It is recommended, however, that this component has a viscosity at 25° C. in the range of 10 to 1,000,000 mPa·s and preferably in the range of 100 to 100,000 mPa·s. If the viscosity is below the recommended lower limit, this will impair mechanical strength and flexibility of the obtained cured product. If, on the other hand, the viscosity exceeds the recommended upper limit, this will impair handleability and workability of the obtained composition. Although there are no special restrictions with regard to mass-average molecular weight of component (A), it is recommended that this characteristic is in the range of 500 to 10,000 and preferably 750 to 3,000. There are no restrictions also with regard to amounts in which epoxy groups can be present in component (A), but it is recommended that the epoxy equivalent of this component (i.e., a ratio of the mass-average molecular weight of this component to the number of epoxy groups contained in one molecule) is in the range of 100 to 2,000, preferably in the range of 100 to 1,000, and more preferably in the range of 100 to 700. If the epoxy number is below the recommended lower limit, this will impair mechanical strength and flexibility of the obtained cured product. If, on the other hand, the epoxy number exceeds the recommended upper limit, this will impair moldability of the composition, and reduce adhesiveness and mechanical strength of the cured product.

Component (A) is an organopolysiloxane that can be exemplified by the compounds represented by the formulas given below, where "a", "b", "c", and "d" have the same meanings as defined earlier, however, "a" and "b" cannot be equal to 0; and "e" and "f" are numbers that satisfy the following conditions:
$0.1 < e < 0.8$; $0 < f < 0.2$; $0.2 \le (e+f) \le 0.9$; and $0.2 \le e/(e+f)$. In the following formulas, "X" designates 3-glycidoxypropyl groups, and "Y" designates 2-(3,4-epoxycyclohexyl)ethyl groups.

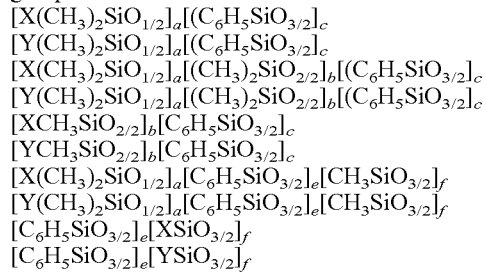

There are no special restrictions with regard to a method for the preparation of component (A). For example, this component can be obtained by the following methods: conducting co-hydrolysis and condensation of a phenyltrialkoxysilane and an alkoxysilane that includes univalent organic groups which contain epoxy groups, e.g., 3-glycidoxypropyltrimethoxysilane or 2-(3,4-epoxycyclohexyl)ethyltrimethoxysilane; conducting de-alcoholization and condensation of the aforementioned alkoxysilane that includes univalent organic groups which contain epoxy groups and a silanol-containing organopolysiloxane prepared by hydrolysis and condensation of a phenyltrichlorosilane or a phenylalkoxysilane; conducting hydrosilylation of an olefin that includes epoxy-containing univalent organic groups and an organosiloxane with silicon-bonded hydrogen atoms obtained by co-hydrolysis and condensation of a phenyltrichlorosilane or phenyltrialkoxysilane in the presence of a dimethylchlorosilane or a similar silane that contains silicon-bonded hydrogen atoms; conducting an equilibrium reaction between an organopolysiloxane obtained by hydrolysis and condensation of a phenyltrialkoxysilane or a phenyltrichlorosilane and a copolymer of a dimethylsiloxane and a methyl (3-glycidoxypropyl)siloxane capped at both molecular terminals with trimethylsiloxy groups, the reaction being conducted in the presence of a basic catalyst; by conducting an equilibrium reaction between an organopolysiloxane composed of $C_6H_5SiO_{3/2}$ units and a cyclic methyl(3-glycidoxypropyl)siloxane or a cyclic methyl{2-(3,4-epoxycyclohexyl)ethyl}siloxane in the presence of a basic catalyst; or by conducting an equilibrium reaction between an organopolysiloxane composed of $C_6H_5SiO_{3/2}$ units and a cyclic methyl(3-glycidoxypropyl)siloxane or a cyclic methyl{2-(3,4-epoxycyclohexyl)ethyl}siloxane and a cyclic dimethylsiloxane in the presence of an acidic or basic catalyst.

Component (B) is a compound that contains groups react the epoxy groups and that is used for curing the composition. The groups of component (B) that are reactive to epoxy groups may be exemplified by primary amino groups, secondary amino groups, hydroxyl groups, phenolic hydroxyl groups, carboxylic groups, anhydride groups, mercapto groups, or silanol groups. From the viewpoint of reactivity and pot life, it is preferable to use phenolic hydroxyl groups. More specifically, component (B) may comprise a compound that contains phenolic hydroxyl group. Specific examples of such compounds are the following: a phenol novolac resin, a cresol-novolac resin, a bisphenol-A type compound, or a similar phenolic resin; as well as an organopolysiloxane that contains phenolic hydroxyl groups. From the viewpoint of improved flexibility of the cured product, it is recommended to use an organopolysiloxane having in one molecule at least two phenolic hydroxyl groups. There are no special restrictions with regard to the amount of the phenolic hydroxyl groups that can be contained in component (B), but it may be recommended that a phenolic group equivalent (which is the ratio of the mass-average molecular weight of this component to the amount of phenolic hydroxyl groups in one molecule) does not exceed 1,000, and, for better reactivity, does not exceed 500.

Component (B) may be an organosiloxane represented by the following general formula:

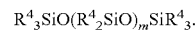

In this formula, $R^4$s are identical or different, and represent halogen-substituted or unsubstituted univalent hydrocarbon groups or univalent organic groups that contain phenolic hydroxyl groups. In each molecule, at least two groups designated by $R^4$ should contain phenolic hydroxyl groups. The univalent hydrocarbon groups can be exemplified by methyl, ethyl, propyl, butyl, pentyl, hexyl, or similar alkyl groups; cyclopentyl, cyclohexyl, cycloheptyl, or similar cycloalkyl groups; phenyl, tolyl, xylyl, or similar aryl groups; benzyl, phenethyl, phenylpropyl, or similar aralkyl groups; 3-chloropropyl, 3,3,3-trifluoropropyl, or similar halogenated alkyl groups. Most preferable are alkyl and aryl groups, especially methyl and phenyl groups. In the above formula, univalent organic groups that contain phenolic hydroxyl groups are listed below and shown by formulas where $R^5$ designates bivalent organic groups: ethylene, methylethylene, propylene, butylenes, pentylene, hexylene, or similar alkylene groups; or ethyleneoxyethylene, ethyleneoxypropylene, ethylenoxybutylene, propyleneoxypropylene, or similar alkylenoxyalkylene groups. Most preferable are alkylene groups, especially propylene groups.

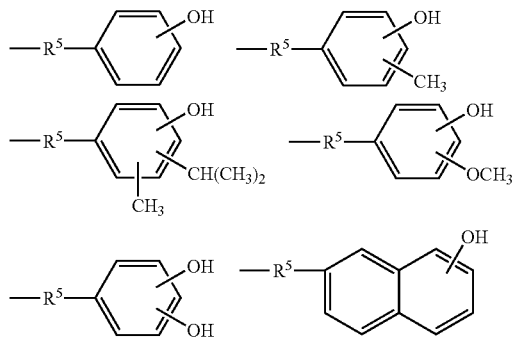

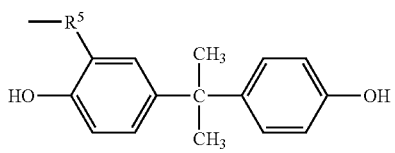

Furthermore, in the above formula, "m" is an integer in the range of 0 to 1,000, preferably in the range of 0 to 100, and most preferably in the range of 0 to 20. If "m" exceeds the recommended upper limit, this will impair miscibility of component (B) with component (A) and will hinder handleability and workability of the composition. Furthermore, a greater amount of solvent will be required for diluting the composition.

The organopolysiloxane that can be used as component (B) is exemplified by the compounds of the following formulas, where "x" is an integer ranging from 1 to 20, and "y" is an integer ranging from 2 to 10:

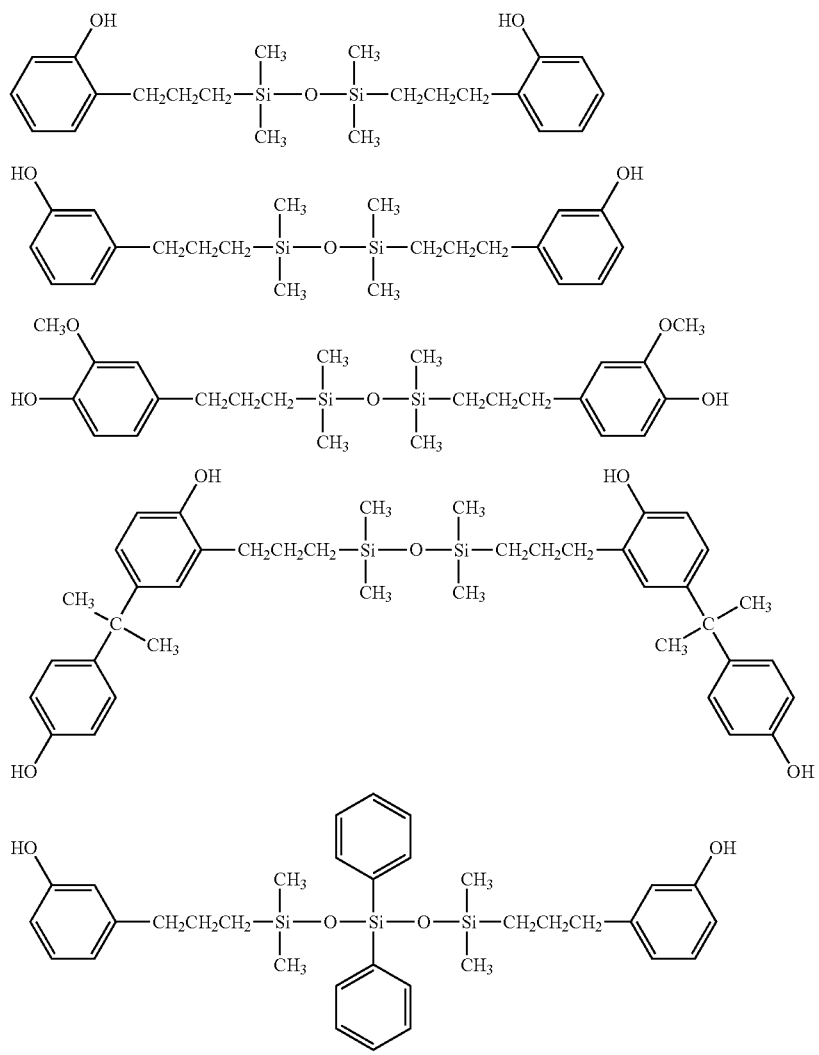

-continued

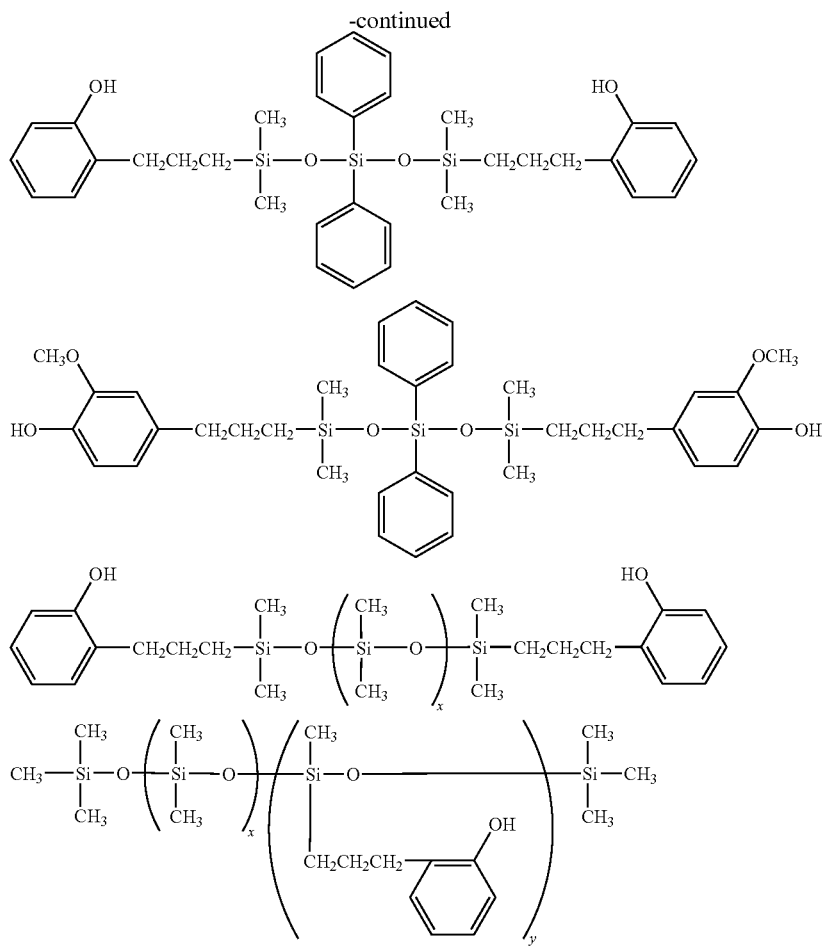

There are no special restrictions with regard to the method suitable for the preparation of component (B). However, it can be recommended to prepare this component by means of a hydrosilylation reaction between an alkenyl-containing phenol compound and an organosiloxane that contains silicon-bonded hydrogen atoms.

There are no special restrictions with regard to the state of component (B) at 25° C., and this component may be in a liquid or in a solid state, but from the viewpoint of ease of handling the liquid state is preferable. When component (B) is liquid at 25° C., it is recommended that it has a viscosity in the range of 1 to 1,000,000 mPa·s, preferably in the mPa·s range of 10 to 5,000. This is because a viscosity below the recommended lower limit may decrease mechanical strength of a cured product obtained from the composition. On the other hand, if the viscosity exceeds the recommended upper limit, this will impair handleability and workability of the composition.

There are no special restrictions with regard to the amount in which component (B) can be added to the composition. It can be recommended, however, to add this component in the amount of 0.1 to 500 parts by mass and preferably 0.1 to 200 parts by mass per 100 parts by mass of component (A). If component (B) contains phenolic hydroxyl groups, it is recommended that the mole ratio of the phenolic hydroxyl groups contained in component (B) to all epoxy groups contained in the composition is in range of 0.2 to 5, preferably 0.3 to 2.5, and most preferably 0.8 to 1.5. If the mole ratio of the phenolic hydroxyl groups contained in component (B) to all epoxy groups contained in the composition is below the recommended lower limit, it will be difficult to provide complete curing of the composition. If, on the other hand, the aforementioned ratio exceeds the recommended upper limit, this will significantly impair mechanical strength of a cured product obtained from the composition.

Component (C) is a thermally conductive filler that imparts thermal conductivity and flame-resistant properties to a cured product. This component can be exemplified by a metal powder of such metals as gold, silver, copper, nickel, brass, shape memory alloys, solder, etc.; fine powder plated or vapor-deposited with metal such as gold, silver, nickel, copper, etc. onto the surfaces of ceramic, glass, quartz, organic resin, etc.; alumina, zinc oxide, magnesia, titania, crystalline silica, or a similar metal oxide powder; aluminum nitride, boron nitride, or a similar metal nitride powder; silicon carbide, or a similar metal carbide powder; aluminum hydroxide, magnesium hydroxide, or a similar metal hydroxide powder; carbon nanotubes, carbon micro fiber, diamond, graphite, or a similar carbon-type powder. These fillers can be in combination of two or more. Most preferable is a metal powder of at least one type selected from gold, silver, copper, and nickel. There are no special restrictions with regard to the shape of particles of component (C), and these particles can be crushed, irregular-shaped, spherical, fibrous, rod-like, flake-like, scale-like, or coil-like. From the viewpoint of molding a cured product having high thermal conductivity, component (C) should be comprised of a silver powder, preferably with particles of a flake-like shape. Also, there are no restrictions with regard to the size of the component (C) particles, but it is recommended that the maximum size does not exceed 200 μm and that an average size of the particles is in the range of 0.001 to 50 μm.

There are no special restrictions with regard to the amount in which component (C) can be added to the composition, but in general, the added amount ranges from 100 to 5,000 parts by mass, preferably 500 to 5,000 parts by mass, and most preferably 500 to 4,000 parts by mass per 100 parts by mass of the sum of components (A) and (B). If component (C) is added in an amount below the recommended lower limit, it will be difficult to impart sufficient thermal conductivity to the cured product of the composition. If, on the other hand, the added amount exceeds the recommended upper limit, the composition will lose flowability.

Silicone powder of component (D) is used for improving adhesive properties of the cured product obtained by curing the composition of the invention. There are no special restrictions with regard to the form of component (D) that may be in the form of rubber or resin. However, from the viewpoint of improvement of cured-product flexibility, the rubber-like form is preferable. Also, there are no restrictions with regard to the average size of component (D) particles, but it can be recommended that the average size of the particles ranges from 0.01 to 500 μm, preferably from 0.01 to 100 μm, and most preferably from 0.01 to 50 μm. If the average particle size is below the recommended lower limit, it will be difficult to prepare the silicone powder, and if, on the other hand, the average particle size exceeds the recommended upper limit, it will be difficult to uniformly disperse the powder in the composition. It is preferable that component (D) contains groups reactive to component (A) or component (B). Such reactive groups can be exemplified by epoxy, amino, or alkoxy groups, of which epoxy groups are preferable. When component (B) contains epoxy groups, it is recommended that the epoxy equivalent determined by titration is below 10,000. If the epoxy equivalent of the silicone powder exceeds 10,000, this will impair reactivity of the powder to component (A) or to component (B). The epoxy equivalent of component (D) is determined by uniformly dispersing the component in a dioxane solution of hydrochloric acid, causing the epoxy groups to react with the hydrochloric acid, and subjecting the excess of the hydrochloric acid to back titration.

Component (D) can be prepared by one of the following methods: dispersing in water a condensation-curable or a hydrosilylation-curable silicone composition; dispersing in water a hydrosilylation-curable or a condensation curable silicone composition that includes an epoxy-containing alkoxysilane; dispersing in water a condensation-curable silicone composition that includes amino-containing alkoxysilane; dispersing in water a hydrosilylation-curable silicone composition that contains an allylglycidylether, or a similar alkenyl-containing epoxy compound; or by treating the surface of a silicone powder with an epoxy-containing alkoxysilane or an amino-containing alkoxysilane. Aforementioned component (D) is also commercially available as a Torefil® E-500, E-600, E-601, E-606, etc. from Dow Corning Toray Co., Ltd., of which the most suitable is Torefil® E-601, the epoxy-containing silicone rubber powder.

There are no special restrictions with regard to the amount in which component (D) can be added to the composition, but in order that the composition does not lose flowability, the added amount should range from 0.1 to 10 parts by mass, preferably 0.5 to 5 parts by mass, and most preferably 1 to 3 parts by mass per 100 parts by mass of the sum of components (A) through (C). If component (D) is added in an amount below the recommended lower limit, it will be difficult to impart sufficient adhesive properties to a cured product of the composition. If, on the other hand, the added amount exceeds the recommended upper limit, the composition will lose flowability and will be difficult to handle and process.

Component (B) is a compound that contains groups that react with the epoxy groups and that is used for curing the composition. The groups of component (B) that are reactive to epoxy groups may be exemplified by primary amino groups, secondary amino groups, hydroxyl groups, phenolic hydroxyl groups, carboxylic groups, anhydride groups, mercapto groups, or silanol groups. From the viewpoint of reactivity and pot life, it is preferable to use phenolic hydroxyl groups. More specifically, component (B) may comprise a compound that contains phenolic hydroxyl group. Specific examples of such compounds are the following: a phenol novolac resin, a cresol-novolac resin, a bisphenol-A type compound, or a similar phenolic resin; as well as an organopolysiloxane that contains phenolic hydroxyl groups. From the viewpoint of improved flexibility of the cured product, it is recommended to use an organopolysiloxane having in one molecule at least two phenolic hydroxyl groups. There are no special restrictions with regard to the amount of the phenolic hydroxyl groups that can be contained in component (B), but it may be recommended that a phenolic group equivalent (which is the ratio of the mass-average molecular weight of this component to the amount of phenolic hydroxyl groups in one molecule) does not exceed 1,000, and, for better reactivity, does not exceed 500.

There are also no restrictions with regard to amounts in which component (E) can be added to the composition, but it may be recommended to add this component in an amount not more than 50 parts by mass, preferably in the range of 0.01 to 50 parts by mass, and most preferably in the range of 0.1 to 5 parts by mass per 100 parts by mass of component (A). If the content of component (E) is below the recommended lower limit, this will allow not efficient acceleration of curing. If, on the other hand, the content of component (E) exceeds the recommended upper limit, this will impair mechanical strength of the cured product.

In order to further improve mechanical strength of the cured body, the composition may incorporate an additional filler other than component (C). Such a filler may be exemplified by glass fiber, ceramic fiber consisting of alumina and silica, boron fiber, zirconia fiber, or a similar fibrous filler; fused silica, crystalline silica, precipitated silica, fumed silica, baked silica, carbon black, glass beads, talc, calcium carbonate, clay, barium sulfate, beryllium sulfate, kaolin, mica, zirconia, or a similar powdered filler. The aforementioned fillers may be used in a combination of two or more. There are no special restrictions with regard to the size and shape of the filler particles, but from the viewpoint of improved moldability, it is preferable to use spherical particles with the average particle within the range of 0.1 to 40 μm. There are also no special restrictions with regard to amounts in which the filler can be added to the composition, but it may be recommended to add this component in an amount not more than 10 parts by mass, preferably in the range of 0.01 to 10 parts by mass per 100 parts by mass of component (A).

In order to improve workability of the composition, the latter can be compounded with a solvent. Such a solvent may be comprised of xylene, methylisobutylketone, diacetone alcohol, n-butylacetate, or propyleneglycol monomethyl ether. Most preferable are the following solvents: 2-ethoxyethylacetate, 2-butoxyethylacetate, diethyleneglycol monoethylether acetate, diethyleneglycol monobutylether acetate (=carbitol acetate), diethyleneglycolethyl ether acetate, or diethyleneglycolbutyl ether acetate. There are no special restrictions with regard to the amounts in which the solvent can be added to the composition, but it can be recommended that the added amount does not exceed 100 parts by mass per 100 parts by mass of the sum of masses of components (A) and (B).

For improving dispersion of component (C) in component (A) or (B) or in a mixture of components (A) and (B), as well as for improving adhesion of the composition to a substrate in the course of curing, the composition may be further combined with a silane coupling agent, titanate coupling agent, or a similar coupling agent. The silane coupling agent can be exemplified by 3-glycidoxypropyl trimethoxysilane, 3-glycidoxypropyl methyldiethoxysilane, 2-(3,4-epoxycyclohexyl) ethyl trimethoxysilane, or a similar epoxy-containing alkoxysilane; N-(2-aminoethyl)-3-aminopropyl trimethoxysilane, 3-aminopropyl triethoxysilane, N-phenyl-3-aminopropyl trimethoxysilane, or a similar amino-containing alkoxysilane; 3-mercaptopropyl trimethoxysilane, or a similar mercapto-containing alkoxysilane. The titanate coupling agent can be represented by i-propoxytitanium tri(i-isostearate). There are no special restrictions with regard to the amounts in which these coupling agents can be used in the composition, but it can be recommended to add them in an amount of not more than 10 parts by mass, preferably in the range of 0.01 to 10 parts by mass per 100 parts by mass of component (A).

The composition of the invention can be prepared by uniformly mixing component (A) through (D), if necessary, with other arbitrary components. There are no special restrictions with regard to the method of mixing. For example, components (A) through (D) and, if necessary, other arbitrary components, can be mixed simultaneously; components (A) and (C) can be premixed and then their mixture can be combined and mixed with components (B) and (D), if necessary, with other arbitrary components; or components (A), (C), (D) and, if necessary, other arbitrary components, can be premixed and then their mixture can be combined and mixed with component (B). There are no limitations with regard to the equipment that can be used for mixing components (A) through (D), if necessary, with other arbitrary components. The equipment used to prepare the composition is exemplified by single- or double-spindle continuous mixers, two roll mills, Ross® mixers, Hobart® mixers, dental mixers, planetary mixers, or kneader-mixers.

Since the composition of the invention possesses excellent handleability and workability, it is suitable for transfer molding, injection molding, potting, casting, immersion coating, dropwise application, etc. By selecting such a method of use as potting, screen printing, or the like, it is possible to minimize consumption of the composition.

The following is a more detailed description of a cured product of the invention. The cured product of the invention is obtained by curing the above-described composition. The cured product is suitable for use as a heat-transfer material placed between semiconductor devices and a heat-radiating plate, or as a sealant resin for electrical and electronic devices. In particular, in view of its excellent thermal conductivity, flexibility, and flame-resistant properties, the cured product is extremely useful as an adhesive agent for semiconductor devices and heat-radiating plates.

EXAMPLES

The curable silicone composition and cured products obtained from the composition will be further described in more detail with reference to practical and comparative examples. In these examples, the viscosity values correspond to 25° C. The following methods were used for measuring properties of the curable silicone composition and the cured products.

[Viscosity of the Curable Silicone Composition]

Viscosity of the curable silicone composition was measured by means of a Rheometer AR550 (the product of TA-Instruments Corp.) with a parallel-plate geometry, a specimen thickness of 200 μm and at a shear rate of 1/sec or 10/sec.

[Thermal Resistance]

The curable silicone composition was sandwiched between two silicon chips (7 mm×7 mm×0.75 mm) so that the thickness of the composition layer became equal to 50 μm, and the composition was then cured by heating for 1 hour in a hot-air-circulation oven at 130° C. Following this, the product was post-cured for another 2 hours in the hot-air-circulation oven at 180° C. As a result, a specimen for measuring thermal resistance was obtained. Thermal resistance of this specimen was measured by means of a thermal resistance measurement instrument of Hitachi Ltd. The obtained result was considered as thermal resistance of the cured product of the invention.

[Adhesive Properties]

A test piece was formed by adhesively attaching a silicon chip (10 mm×10 mm) to a nickel or aluminum plate through a 50 μm-thick layer of a curable silicone composition, and then curing the composition by heating the package for 1 hour at 150° C. The obtained test piece was measured with regard to peeling resistance strength (kgf/cm$^2$) on a bond tester (MODEL-SS0100KP, the product of Seishin Trading Co., Ltd.) at 25° C. at a peeling rate of 50 mm/min.

[Composite Modulus of Elasticity of Cured Product]

The curable silicone composition was defoamed under a pressure of 70 mmHg and poured into a 10 mm-wide, 50 mm-long, and 2 mm-deep cavity of a mold. The composition was then subjected to pressure curing for 60 min. at 130° C. under pressure of 2.5 MPa. The product was then subjected to secondary heating for 2 hours in an oven at 150° C. As a result, a cured sample was obtained. The obtained sample was used for measuring the coefficient of composite elasticity with the use of an ARES-type viscoelastomer (RDA700, a product of RHEOMETRIC Scientific Co., Inc.) with 0.05% twisting, 1 Hz frequency, and at temperatures of 0° C. and 50° C.

Practical Example 1

A curable silicone composition was prepared by mixing the following components: 5.0 parts by mass of an organopolysiloxane having a mass-average molecular weight of 1,000, viscosity of 9,630 mPa·s, an epoxy equivalent of 345, and represented by the following average unit formula:

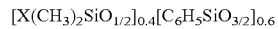

(where X is a 3-glycidoxypropyl group); 4.0 parts by mass of an organopolysiloxane having viscosity of 3,050 mPa·s and represented by the following formula:

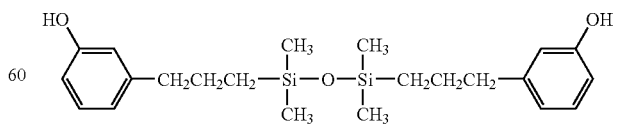

1.0 part by mass of a microcapsule type amine catalyst (HX-3941HP; the product of Asahi Kasei Corp.; amine content 40 mass %); 90 parts by mass of a flakes-type silver powder (the product of Fukuda Metal Foil & Powder Co., Ltd.; average particle size: 6.4 µm; tap density=4.6 g/cm³); 2 parts by mass of an epoxy-containing silicone rubber powder (Torefil® E-601; the product of Dow Corning Toray Co., Ltd.; epoxy equivalent=5,000; average particle size is in the range of 1 to 5 µm); and 5 parts by mass of a carbitol acetate. Viscosity of the composition after vacuum defoaming and composite modulus of elasticity and adhesive properties of the cured product were measured under the above-described conditions. The results are shown in Table 1.

Practical Example 2

A curable silicone composition was prepared by mixing the following components: 3.9 parts by mass of an organopolysiloxane having a mass-average molecular weight of 1,000, viscosity of 9,630 mPa·s, an epoxy equivalent of 345, and represented by the following average unit formula:

$$[X(CH_3)_2SiO_{1/2}]_{0.4}[C_6H_5SiO_{3/2}]_{0.6}$$

(where X is a 3-glycidoxypropyl group); 3.1 parts by mass of an organopolysiloxane having viscosity of 3,050 mPa·s and represented by the following formula:

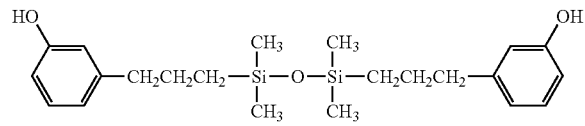

1.0 part by mass of a microcapsule type amine catalyst (HX-3941HP; the product of Asahi Kasei Corp.; amine content 40 mass %); 90 parts by mass of a flakes-type silver powder (the product of Fukuda Metal Foil & Powder Co., Ltd.; average particle size: 6.4 µm; tap density=4.6 g/cm³); 2 parts by mass of an epoxy-containing silicone rubber powder (Torefil® E-601; the product of Dow Corning Toray Co., Ltd.; epoxy equivalent=5,000; average particle size is in the range of 1 to 5 µm); and 6 parts by mass of a carbitol acetate. Viscosity of the composition after vacuum defoaming and composite modulus of elasticity and adhesive properties of the cured product were measured under the above-described conditions. The results are shown in Table 1.

Comparative Example 1

The thermally conductive curable silicone composition was prepared by the same method as in Practical Example 1, except that the composition did not include the epoxy-containing silicone rubber powder and that the carbitol acetate was added in the amount of 4 parts by mass. The properties of the composition were evaluated in the same manner as in Practical Example 1. The results are shown in Table 1.

Comparative Example 2

The thermally conductive curable silicone composition was prepared by the same method as in Practical Example 2, except that the composition did not include the epoxy-containing silicone rubber powder. The properties of the composition were evaluated in the same manner as in Practical Example 1. The results are shown in Table 1.

TABLE 1

| Properties | Examples Invention Pr. Ex. 1 | Pr. Ex. 2 | Comparative Examples Comp. Ex. 1 | Comp. Ex. 2 |
|---|---|---|---|---|
| Viscosity (Pa · s) | 31 | 34 | 18 | 17.5 |
| Thermal resistance (° C./W) | 0.12 | 0.11 | 0.14 | 0.10 |
| Adhesive properties (kgf/cm²): | | | | |
| nickel plate | 11 | 13 | 12 | 7 |
| aluminum plate | 11 | 12 | 2 | 4 |
| Composite modulus of elasticity G* (GPa) | | | | |
| 0° C. | 2.5 | 2.5 | 3.3 | 2.6 |
| 50° C. | 0.8 | 1.1 | 1.0 | 1.1 |

INDUSTRIAL APPLICABILITY

Since the curable silicone composition of the invention has low viscosity and is characterized by excellent handleability and workability, it is suitable for transfer molding, injection molding, potting, casting, immersion coating, dropwise application, etc. When the composition is cured, it forms a cured product that has excellent elasticity, adhesiveness, and heat-conductive properties. Therefore, such a product can be used as a sealant, injection-molding agent, coating agent, adhesive agent, etc. for electrical and electronic devices. In particular, the composition of the invention shows good adhesion to such hard-to-adhere material as nickel and aluminum. Therefore, the composition may find application as a structural material for heat-conductive parts of electrical and electronic devices, in particular, as a thermal interface material (TIM).

The invention claimed is:

1. A curable silicone composition comprising:
   (A) a liquid organopolysiloxane having in one molecule at least two epoxy groups;
   (B) a compound containing groups that react with the epoxy groups;
   (C) a thermally conductive filler; and
   (D) a silicone rubber powder containing epoxy groups and having an epoxy equivalent below 10,000, and having an average particle size in the range of 0.01 to 500 µm.

2. The curable silicone composition according to claim 1, wherein component (A) is an organopolysiloxane of the following average unit formula (I):

$$(R^1{}_3SiO_{1/2})_a(R^2{}_2SiO_{2/2})_b(R^3SiO_{3/2})_c(SiO_{4/2})_d$$

where $R^1$, $R^2$, and $R^3$ are identical or different, and represent halogen-substituted or unsubstituted univalent hydrocarbon groups or epoxy-containing univalent organic groups; however, in one molecule, at least two of the groups designated by $R^1$, $R^2$, and $R^3$ are epoxy-containing univalent organic groups, and 20 mole % or more of groups represented by $R^3$ are aryl groups; and "a", "b", "c", and "d" are numbers that satisfy the following conditions: $0 \leq a \leq 0.8$; $0 \leq b \leq 0.8$; $0.2 \leq c \leq 0.9$; $0 \leq d < 0.8$; and $[a+b+c+d]=1$.

3. The curable silicone composition according to claim 2, wherein the epoxy-containing univalent organic groups in the organopolysiloxane represented by average unit formula (I) are glycidoxyalkyl groups or epoxycycloalkylalkyl groups.

4. The curable silicone composition according to claim 2, wherein "a" and "b" in the organopolysiloxane represented by average unit formula (1) are numbers that satisfy the following conditions: 0<a≤0.8 and b=0.

5. The curable silicone composition according to claim 1, wherein component (B) is a compound that contains phenolic hydroxyl groups.

6. The curable silicone composition according to claim 5, wherein component (B) is an organosiloxane having in one molecule at least two phenolic hydroxyl groups.

7. The curable silicone composition according to claim 6, wherein component (B) is an organosiloxane represented by the following general formula (2):

$$R^4{}_3SiO(R^4{}_2SiO)_mSiR^4{}_3$$

where $R^4$s are identical or different, and represent halogen-substituted or unsubstituted univalent hydrocarbon groups or univalent organic groups that contain phenolic hydroxyl groups; however, in a molecule, at least two $R^4$s are univalent organic groups that contain phenolic hydroxyl groups; and "m" is an integer in the range of 0 to 1,000.

8. The curable silicone composition according to claim 1, wherein component (B) is contained in an amount of 0.1 to 500 parts by mass per 100 parts by mass of component (A).

9. The curable silicone composition according to claim 1, wherein component (C) is a metallic thermally conductive filler of at least one type selected from the group consisting of gold, silver, copper, and nickel.

10. The curable silicone composition according to claim 1, wherein component (C) is contained in an amount of 100 to 5,000 parts by mass per 100 parts by mass of the sum of components (A) and (B).

11. The curable silicone composition according to claim 1, wherein component (D) is contained in an amount of 0.1 to 10 parts by mass per 100 parts by mass of the sum of components (A) to (C).

12. The curable silicone composition according to claim 1, further comprising (E) a curing accelerator.

13. A cured product obtained by curing the curable silicone composition according to claim 1.

* * * * *